(No Model.)
G. E. JUDSON.
COTTON PRESS.
No. 254,774. Patented Mar. 7, 1882.
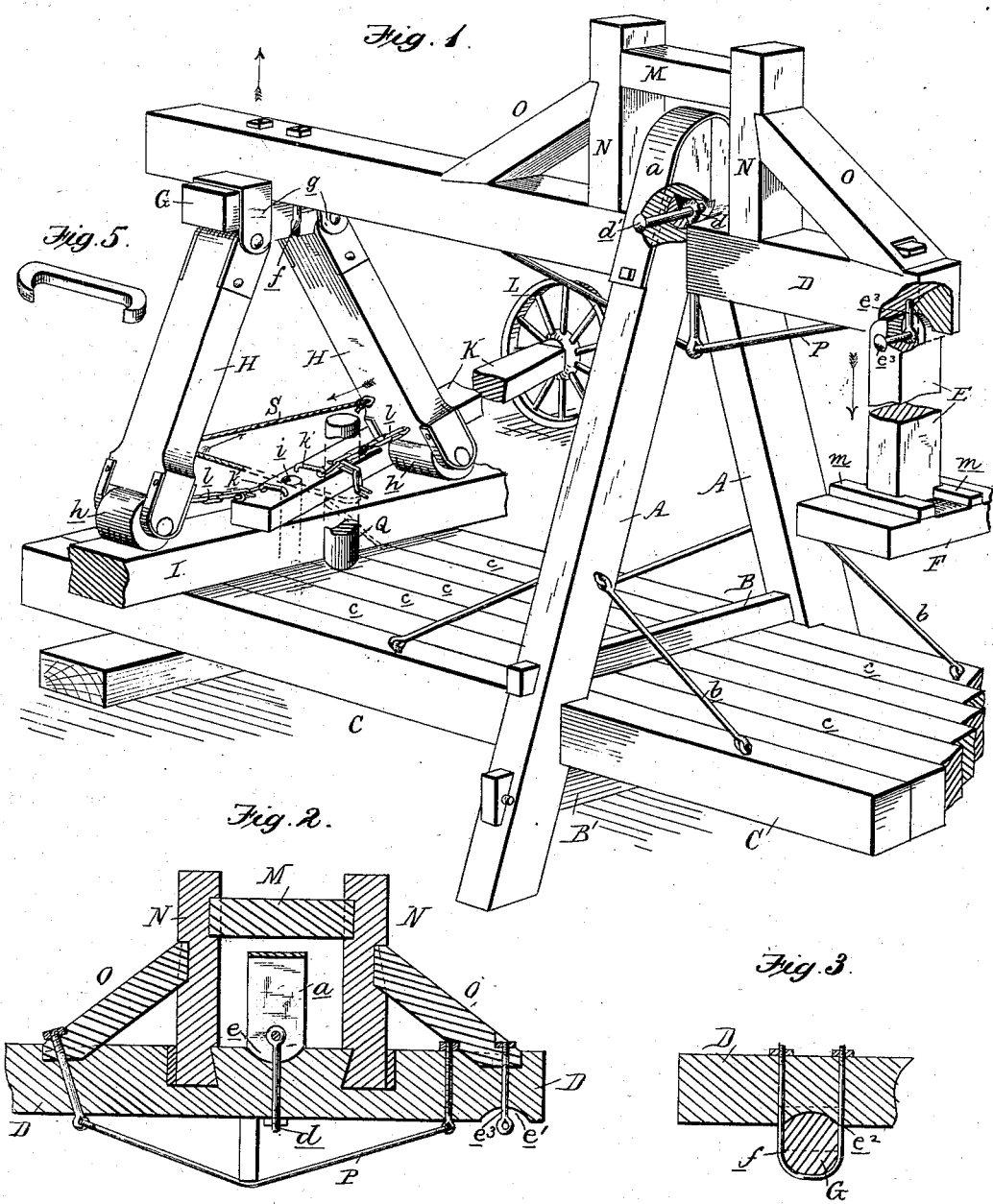
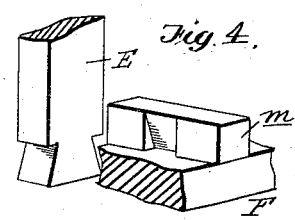
Attest.
W. H. H. Knight
A. B. Robertson
Inventor,
Geo. E. Judson
By T. W. Robertson
Attorney
N. PETERS, Photo-Lithographer, Washington, D. C.

UNITED STATES PATENT OFFICE.

GEORGE E. JUDSON, OF WILLIAMSBURG, MISSISSIPPI.

COTTON-PRESS.

SPECIFICATION forming part of Letters Patent No. 254,774, dated March 7, 1882.

Application filed February 4, 1882. (No model.)

*To all whom it may concern:*

Be it known that I, GEORGE E. JUDSON, a citizen of the United States, residing at Williamsburg, in the county of Covington and State of Mississippi, have invented certain new and useful Improvements in Cotton-Presses, of which the following is a specification, reference being had therein to the accompanying drawings.

Figure 1 represents a perspective view broken away in parts to show details of construction; Fig. 2, a sectional detail of one end of the lever; Fig. 3, a sectional detail of the other end of the lever, showing the manner of connecting the toggle-block; Fig. 4, a perspective detail, partly in section, showing the mode of connecting the follower; and Fig. 5, a detail perspective view of a hook-link used to connect the toggle-chain to the operating-lever.

The invention relates to an improvement in toggle-presses; and it consists in the construction, operation, and combination of the various parts, as more fully hereinafter described, and then pointed out in the claims.

In the drawings, A A represent two angular posts having their upper meeting ends bound with a yoke, $a$, and provided near their lower ends with two cross-timbers, B B'. Between the posts A and resting on the timber B' is a base, C, consisting of a series of closely-laid timbers, $c$, the outer of which are connected by brace-rods $b$ to the posts, in order to firmly support the latter.

The opening at the junction of the upper ends of the posts is widened and rounded, as represented in Fig. 1, for the purpose of receiving the lever D, which is provided with a concave recess, $e$, for receiving said rounded surface, and is hung therein by an eyebolt, $d$, and a cross-bolt, $d'$, which latter bolt passes through the posts and the eyebolt, forming what may be termed a "knuckle-joint."

The lever is provided near each end, at its under surface, with concave recesses $e'$ $e^2$, in the former of which is secured by bolts $e^3$ the round upper end of the bar E, connecting it with the follower F, while in the latter recess is secured the round central part of the toggle-block G by a yoke-bolt, $f$. This construction forms knuckle-joints between the lever and the follower and toggle-block, as well as between the lever and posts.

To the toggle-block G are pivotally connected the toggle-arms H H, which are provided with rounded ends to fit into concave recesses in the under side of the toggle-block, in which recesses they are secured by bolts passing through them and through the yokes $g$, which pass one at each side by the lever around the toggle-block. The lower ends of the toggle-arms are provided with rollers $h$, which travel on a track formed by a timber, I, which is secured to the base C, preferably at right angles to the lever D.

Near to or about the center of the track I is pivoted by a bolt, $i$, a long lever, K, which is supported at its outer end by a wheel, L, and is provided at each side of the bolt $i$ with two equidistant staples, $k$ $k'$, by which it is connected with chains $l$ $l$ to the toggle-arms.

The lever D is provided at its upper side, above the pivotal point, with a compression-truss frame, M N O, and at its lower side below the pivotal point with a tension-truss, P, in order to firmly support it and prevent it from breaking.

The follower-bar E is provided with a dovetailed lower end to fit into undercut recesses in bars $m$, secured to the upper face of the follower F.

Q represents a post for limiting the downward movement of the lever D, which should be arranged at such a distance from the center on which the lever turns that the lever will not come in contact with it.

The operation of the machine is as follows: The chains $l$ are connected with the toggle-arms and the lever K by hooks, as shown in Fig. 1, and the lever K is then turned one-half around on its pivot $i$ by horse or other power attached to the extremity of the lever, so as to draw the lower ends of the roller toggle-arms toward each other. Hooks of the shape shown in Fig. 5 are then used to connect the chains to the staples opposite to those with which they were first connected, and the movement of the lever is then reversed, so as to draw the toggle-arms still nearer together. These movements are repeated alternately, reversing the position of the lever and reversing and shortening the chains in relation to the staples k k until the lever D has been raised sufficiently at one end to cause its other end to give the desired movement to the follower, after which, as soon as the bale has been banded, the chains are detached from the lever and the toggle allowed to slowly open, the speed of the movement being limited by means of a rope, S, which passes once around the post Q through an eye (not shown in the drawings) secured to one of the roller toggle-arms, and is secured to the opposite toggle-arm, as shown in Fig. 1.

In order to withstand the immense strain of the lever D, the base C is made extra heavy and supports the toggle mechanism and the bale-box at opposite ends and on each side of the posts A.

By the construction here shown a press that is very simple, not liable to get out of order, yet of the most powerful character, is made, and one that can be built and put up by any ordinary carpenter with a little assistance from a smith. The construction of the parts is such that it is not liable to give way under the most powerful strain likely to be brought upon it.

Although I have shown and prefer to use the track at right angles to the lever, as it makes the most compact and convenient arrangement, yet it is obvious that it might be arranged parallel with said lever should it be desired so to do.

What I claim is—

1. The combination, with the lever D and a supporting-frame, of the roller toggle-arms H, means for operating said toggle-arms, pivotal connections between the toggle-arm and lever, and the track I, substantially as and for the purpose specified.

2. The combination, with the lever D and a supporting-frame, of the roller toggle-arms H, pivotal connection between said toggle-arms and lever, mechanism for operating said arms, and the track I, both the toggle-arms and the track being arranged at right angles to the lever D, substantially as and for the purpose specified.

3. The combination, with the lever D, a supporting-frame, the roller toggle-arms H, means for operating the same, and the track I, of the lever K, supported at its outer end by a wheel, L, and pivotal connections between the lever K and the toggle-arms, substantially as and for the purpose specified.

4. The combination, with the posts A, lever D, roller toggle-arms H, and the track I, of the base C, extending the full length of the lever D, substantially as and for the purpose specified.

5. The combination, with the lever D, a supporting-frame for the same, roller toggle-arms H, and track I, of the lever K, staples k k', and adjustable chains l, constructed and operating substantially as and for the purpose specified.

6. The lever D, provided with a compression-truss frame, M N O, one side of its pivotal point, and on the opposite side with a tension-truss, P, substantially as and for the purpose specified.

7. The lever D, provided with an upper concave recess, e, in combination with the posts A, having rounded portions to fit in said recesses, substantially as and for the purpose specified.

8. The lever D, provided with an upper concave recess, e, and with lower concave recesses, e' e², in combination with the posts A, the toggle-block G, and the follower-bar E, having rounded portions to fit in said recesses, substantially as and for the purpose specified.

In testimony whereof I affix my signature in presence of two witnesses.

GEORGE E. JUDSON.

Witnesses:
   T. J. W. ROBERTSON,
   R. ROBERTSON.